(No Model.) 6 Sheets—Sheet 1.

G. RICHARDSON.
MACHINE FOR GLUING AND PUTTING BOXES TOGETHER.

No. 350,943. Patented Oct. 19, 1886.

Witnesses:
Chas. D. Goss.
Frank Regensdorf.

Inventor,
George Richardson,
per C. H. Bottum,
Attorney.

(No Model.) 6 Sheets—Sheet 2.
G. RICHARDSON.
MACHINE FOR GLUING AND PUTTING BOXES TOGETHER.
No. 350,943. Patented Oct. 19, 1886.
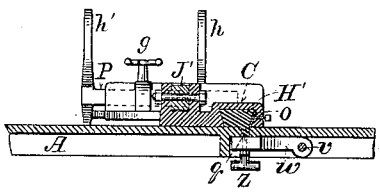
Fig. 8.
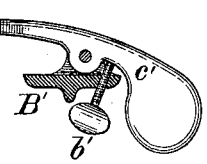
Fig. 10.
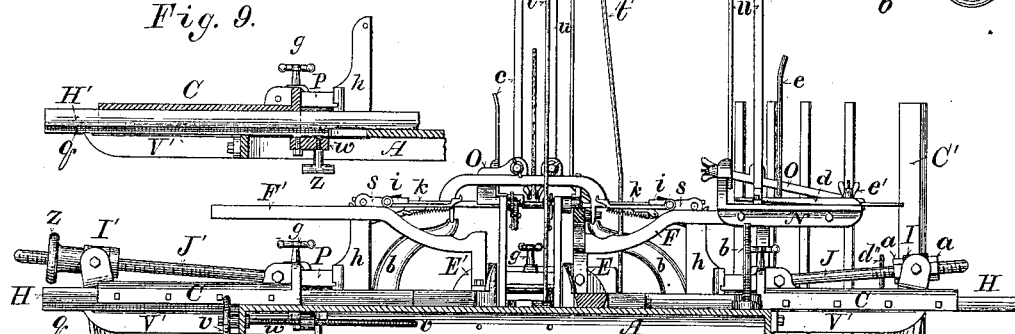
Fig. 9.
Fig. 2.
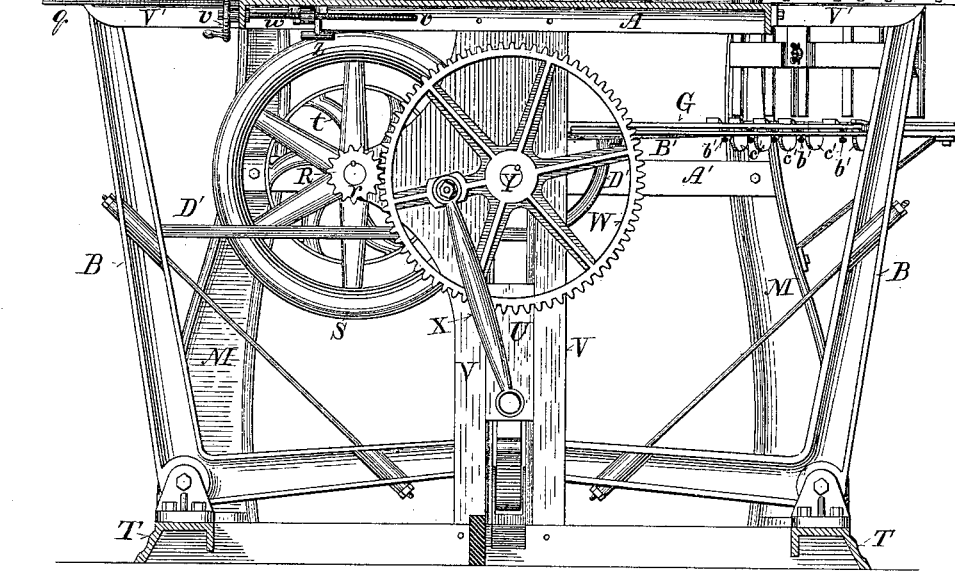
Witnesses:
Chas. L. Goss,
Frank Regensdorf
Inventor,
George Richardson
per E. H. Bottum
Attorney.

(No Model.) 6 Sheets—Sheet 4.

G. RICHARDSON.
MACHINE FOR GLUING AND PUTTING BOXES TOGETHER.

No. 350,943. Patented Oct. 19, 1886.

Witnesses:
Chas. L. Goss
Frank Regensdorf

Inventor
George Richardson
per C. H. Bottum
Attorney

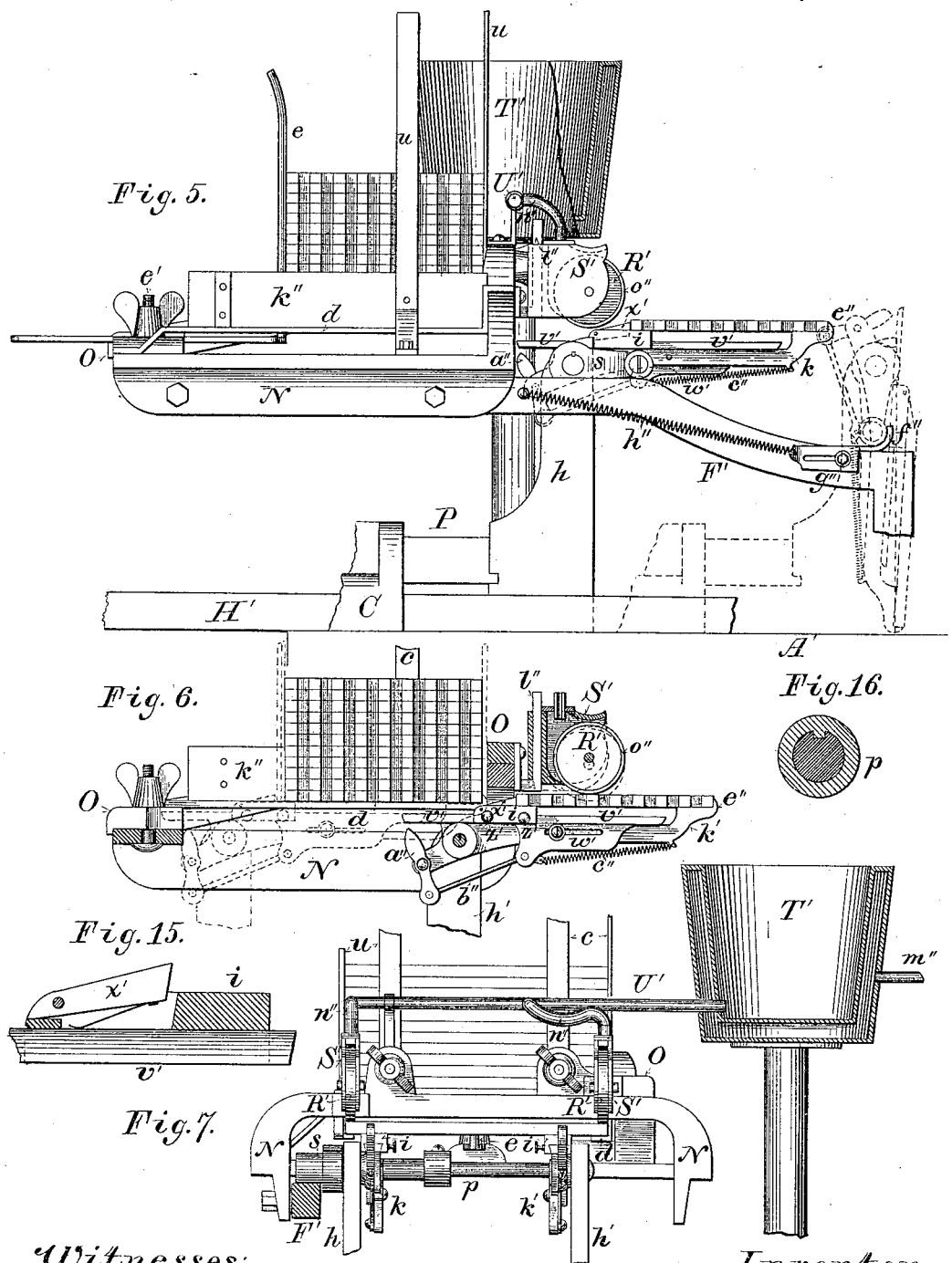

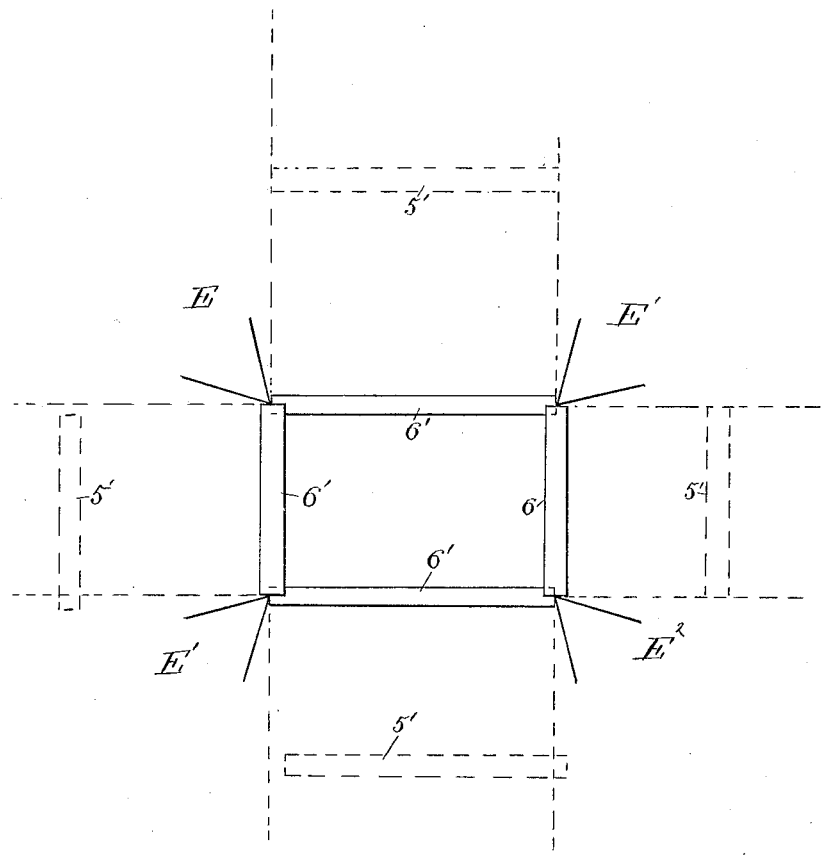

UNITED STATES PATENT OFFICE.

GEORGE RICHARDSON, OF MILWAUKEE, WISCONSIN, ASSIGNOR, BY DIRECT AND MESNE ASSIGNMENTS, TO FRED A. CARY, OF SAME PLACE.

MACHINE FOR GLUING AND PUTTING BOXES TOGETHER.

SPECIFICATION forming part of Letters Patent No. 350,943, dated October 19, 1886.

Application filed August 4, 1883. Serial No. 102,853. (No model.)

*To all whom it may concern:*

Be it known that I, GEORGE RICHARDSON, of the city of Milwaukee, in the county of Milwaukee and State of Wisconsin, have invented certain new and useful Improvements in Box-Machines; and I do hereby declare that the following is a full, clear, and exact description thereof, which will enable others skilled in the art to which it pertains to make and use the same, reference being had to the accompanying drawings, and to the letters of reference marked thereon, which form a part of this specification.

My invention relates to machines employed in the manufacture of dovetailed, lock-joint, fingered, or other boxes of similar construction, for gluing and putting the same together.

It consists, essentially, of a table provided with four racks for holding the ends and sides, a rising-and-falling central table adapted to receive the bottoms from a chute beneath and raise the same to a level with the stationary table, a rack for holding the bottoms near the outer end of said chute, four angular levers provided with cross-heads, adapted to take the sides and ends, one at a time, from their respective racks, carry them into position, and form the box upon the central movable table, which lifts the bottom into position from below, a swinging arm to take the bottoms, one by one, from their rack and deposit them in position upon the movable table, together with a device for gluing and mechanism for adjusting the machine for making boxes of different sizes.

The objects of my invention are, first, economy of time and expense in the manufacture of boxes of this class; and, second, accuracy and uniformity of work.

Figure 1:
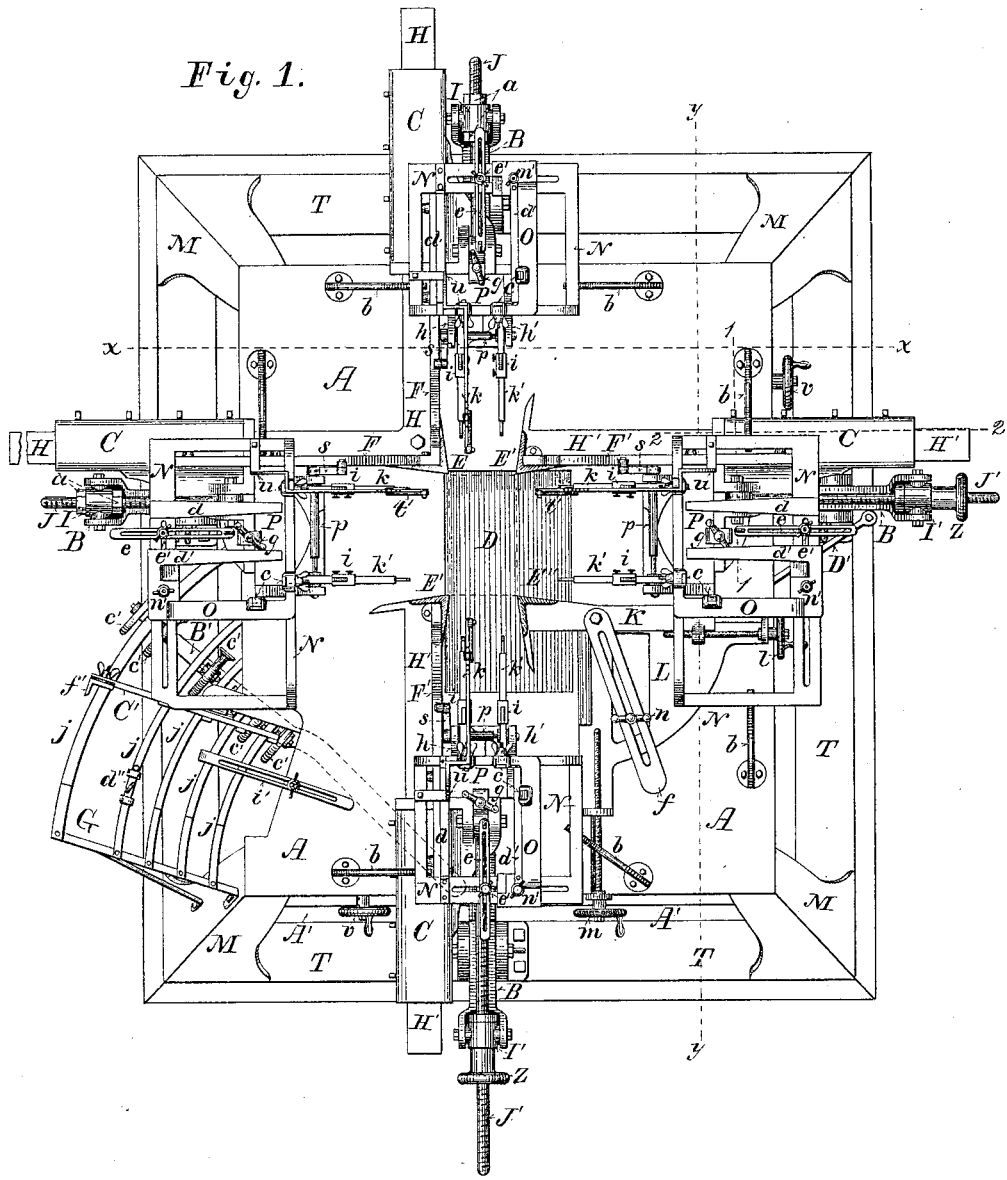
Figure 3:
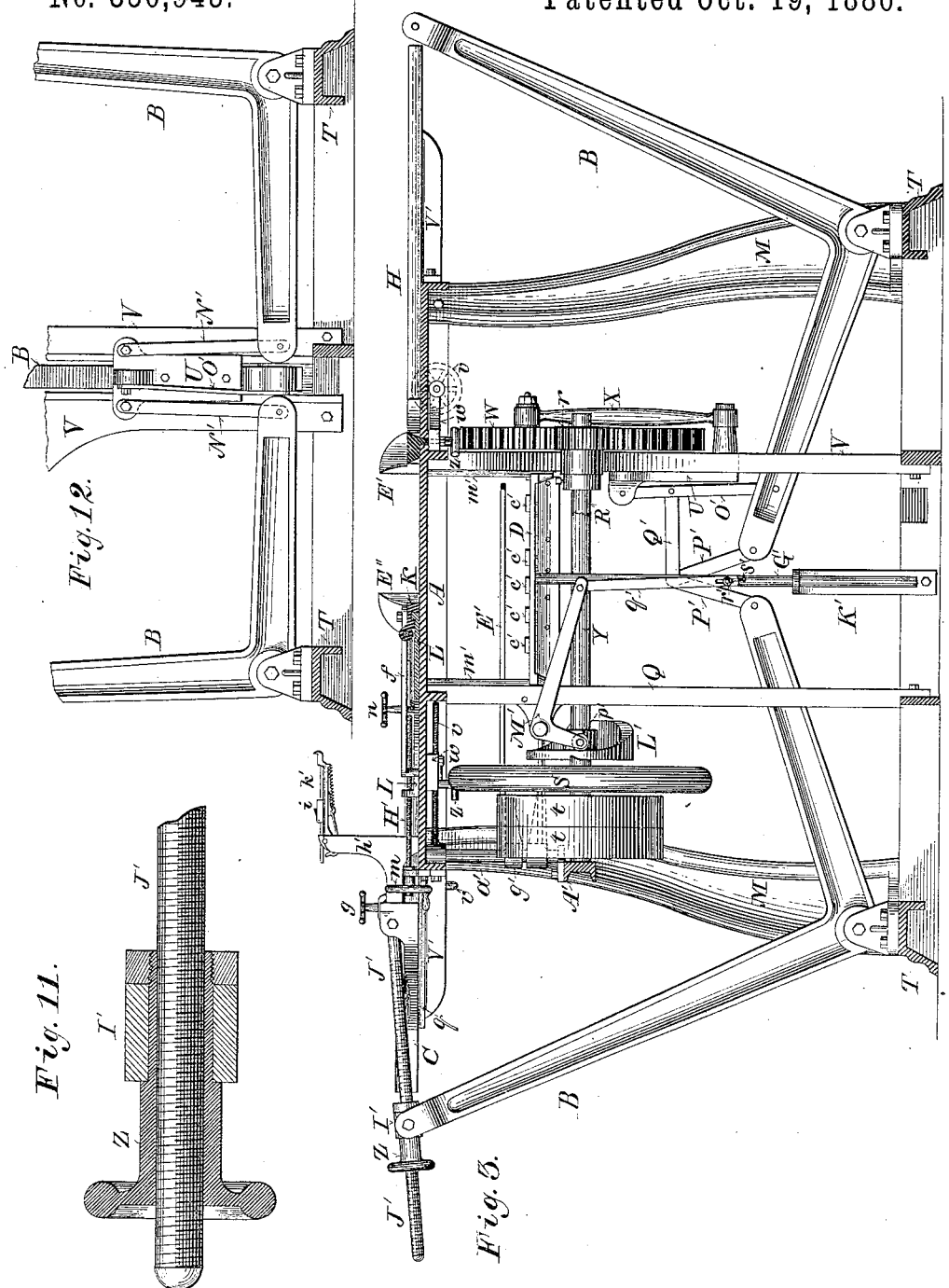
Figure 4:
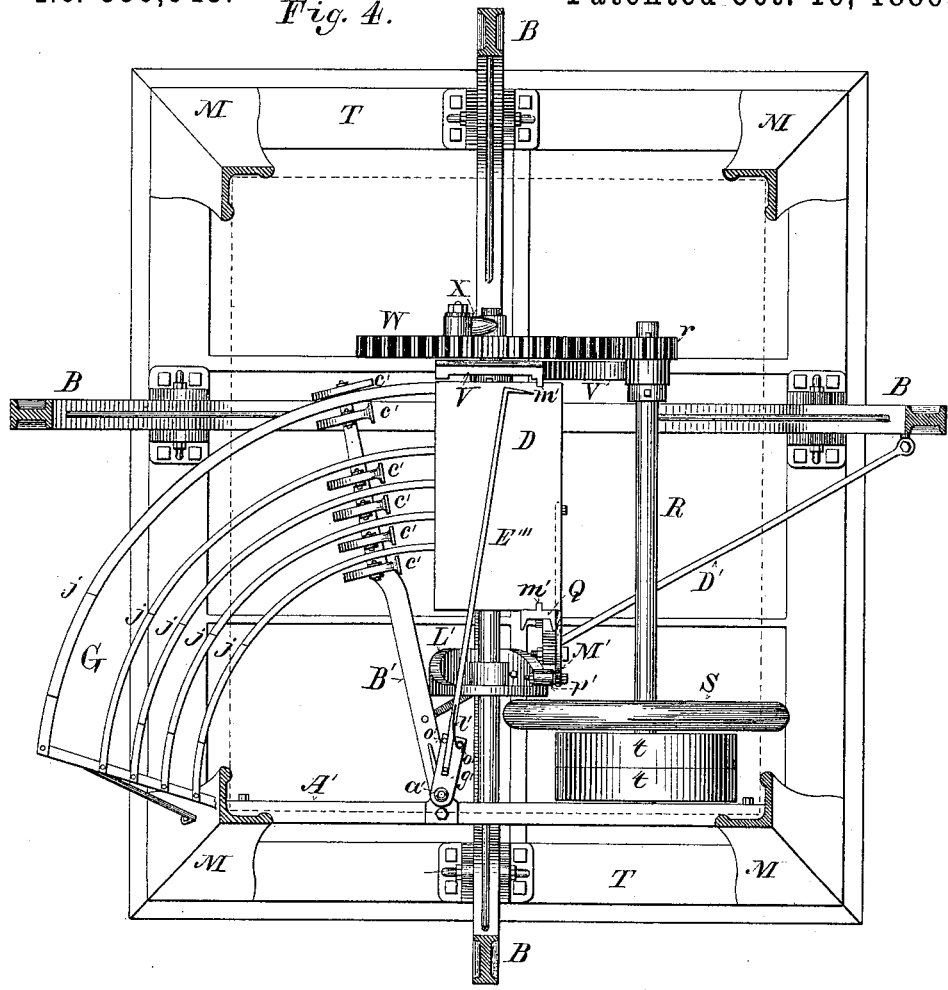
Figure 13:
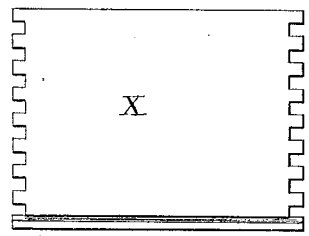
Figure 14:
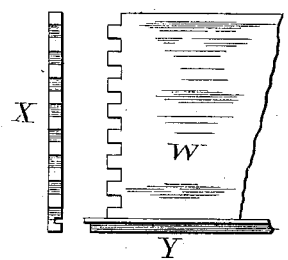

In the accompanying drawings like letters refer to the same parts in the several figures, and in the same Figure 1 is a plan view of my new machine. Fig. 2 is a vertical cross section of the same on the line *x x*, Fig. 1. Fig. 3 is a longitudinal vertical section of the same on line *y y*, Fig. 1. Fig. 4 is a plan view of the machine with the fixed table removed. Figs. 5, 6, and 7 are detail views on an enlarged scale of the gluing device and of the movable adjustable arms upon the cross-heads C C. Fig. 8 is a vertical cross-section of a cross-head, C, on the line 1 1, Fig. 1. Fig. 9 is a longitudinal vertical section of the same on the line 2 2, Fig. 1. Figs. 10, 11, 12, 15, and 16 are details; and Figs. 13 and 14 illustrate the method of cutting the pieces and of putting the same together. Fig. 17 is a diagram or plan showing the arrangement and operation of the acute-angled corner-pieces.

A is an iron table supported by legs M M, resting upon base T. It has at the center a quadrangular opening, which is exactly filled by the table D when the same is in its upper position.

To table A are secured the two stationary dovetailed ways H H, which meet at right angles at one corner of the central opening, and the two adjustable dovetailed ways H' H', upon which several ways the cross-heads C C C are adapted to be moved back and forth between the racks N N N and central opening in the table A. The cross-heads C C are channeled to fit the dovetailed ways H H', and are provided with gibs *o o* to take up wear, Fig. 8. They are also furnished with the standards *h h'*, in which the small telescoping shafts *p p* bearing the arms *k k'*, have their bearings. To cause both segments of the small shafts *p p* to turn together, and thereby preserve the parallelism of the arms *k k'*, the smaller segments are grooved to receive lugs projecting from the inner sides of the tubular segments, in which they freely slide, Fig. 16. The standards *h' h'* rise from base-blocks P P, which slide in channels formed in cross-heads C C at right angles to ways H H', so as to permit of the lateral adjustment of the arms *k' k'* for boards or pieces of different lengths. When properly adjusted, the blocks P P, with their standards *h' h'* and arms *k' k'*, are held firmly in position by means of the clamps and screws *g g*. To the larger ends of shafts *p p*, just outside of the fixed standards *h h*, are secured the small cranks *s s*, which are provided at their ends with small wheels or rollers adapted to run upon the tracks F F'. The movable ways H' H' have flanges *q q* formed upon their under sides and adapted to slide in grooves cut in table A. They are advanced toward or withdrawn from the center of the table by means of the long hand-screws *v v*, passing through threaded eyes in the blocks *w w*, which are bolted to said ways through the slots in table A, in which they slide, Figs. 2 and 9. They are held in place when properly adjusted by means of the set-screws $z\ z$.

B B B are angular levers pivoted at their angles to the bed T, near the middle of its four sides. The longer arms of said levers extend upward, and are connected with the cross-heads C C by the threaded bars J J', while the shorter arms extend underneath the machine and are connected near its center with the cross head U, which moves up and down upon ways in the slotted standard V. The cross-head U is connected by the pitman X with the large gear-wheel W, which is keyed to shaft Y and driven by the small gear-wheel or pinion $r$, meshing therewith, and keyed to the driving-shaft R, which is also provided with the heavy balance-wheel S and with the fixed and loose pulleys $t\ t$, Figs. 2, 3, and 4. The levers B B are forked at their upper ends, between the limbs of which the collars I I' upon the threaded bars J J' are pivoted. The collars I I' are adjusted and held in position by means of the set-nuts $a\ a$ on each side of them. The bars J' J' are made longer than the others, and are threaded almost their entire length, and provided with the hand-screws Z Z, which are secured upon and turn freely in the collars I' I', as shown in Figs. 2, 3, and 11. By means of this device the bars J' J' may be lengthened or shortened between the levers B B and cross-heads C C, to correspond with the advancing or withdrawing of the ways H' H' and tracks F' F'. The inner ends of the ways H H' are provided with the acute-angled corners E E'. At the angle formed by the meeting of the stationary ways H H the fixed corner E is raised. The corners E' E' are raised upon the ways H' H' and are each adjustable with them in a single direction. The corner E'' is raised upon the inner end of the bar K, which is grooved to slide upon a way raised on the right-angled plate L, Figs. 1 and 3, which has a flange on its under face near the inner edge, adapted to move at right angles to bar K in a groove cut in table A. The bar K is moved longitudinally by means of the hand-screw $l$, while it is moved laterally at right angles to its longitudinal movement by means of the hand-screw $m$. By this device the corner E'' may be accurately adjusted in two directions at right angles to each other. When properly adjusted, the corner E'' is held in position by the slotted clamp $f$, pivoted at one end to bar K and resting at the other end upon table A, and by the set-screw $n$, passing through the slot in clamp $f$ into table A, Figs. 1 and 3.

The diagram, Fig. 15, shows the mode of operation of the corner-pieces E E', &c.

5' 5', &c., represent the side and end pieces of the box, (shown in dotted lines,) and 6' 6', &c., show the same at the point of assemblage. The pieces are brought to a perpendicular just before they reach the corner-pieces E E'. The corner-pieces present to the box-sections a converging way, so that if any of the box-sections be out of their proper position they are guided back to position by these corner-pieces. As the box-sections advance and pass the apexes of the corner-pieces E E' they are brought to and held in exactly the right relative position, so that the fingers at the ends of the box sections interlock. As will be seen in full lines 6' 6', the box-sections are held against the corner-pieces E E' until the box corners are completely interlocked. Four adjustable racks, N N, are raised upon supports $b\ b$ from table A in such positions that the arms $k\ k'$ on cross-heads C C come directly underneath the same at the outer limits of the travel of said cross-heads. Each of the racks N N is provided with the fixed upright guides $u\ u$, the adjustable upright guides $c\ c$ raised upon the transversely sliding arms O O, the horizontal arms or supports $d\ d'$ upon which the sides or ends are piled one above the other, and with the gages $e\ e$, which have long slotted feet, by means of which they are secured to the outer sides of the racks N N by thumb-nuts and bolts $e'\ e'$, passing through the slots in said feet and racks. By this method of attachment the gages $e\ e$ are made adjustable in two directions. The guides $c\ c$ and the supports $d'\ d'$ are attached to arms O O and are adjustable therewith. The broad right-angled shanks of the arms O O are secured to the racks N N by thumb-nuts and bolts $n'\ n'$, passing through the same, the slots in said racks permitting of the lateral adjustment of the arms without removing the bolts.

G is a curved chute composed of bars $j\ j$, leading from one corner of the machine to the side of table D, and lying in the same horizontal plane therewith when said table is at the lower limit of its travel.

B' is a swinging arm secured to the small vertical shaft $a'$, which has bearings in table A and in the cross-bar A', and is at the center of a circle of which the chute G forms an arc. It extends just underneath the chute G to the outer edge thereof, and is provided at the end and between the bars $j\ j$ with the counterbalanced pivoted fingers $c'\ c'\ c'$, the tips of which rise in front above the top of the chute, and are adjustable in height by means of the thumb-screws $b'\ b'\ b'$. The outer finger, $c'$, projects a little in advance of the others, so as to prevent the bottoms from being thrown out of position by the centrifugal tendency of the swinging arm B'. The rod D' connects said arm B' with the lever B, (on the opposite side of the machine,) from which it gets its motion.

C' is an upright rack secured directly above the chute G to table A, which is cut away to receive it and to allow for the filling of the same with box-bottoms. It extends downward nearly to the top of the chute, and is provided at its outer edge with the right-angled flange $f'$, which confines the bottoms at the outer ends.

$d''$ is an adjustable upright gage secured by means of a collar and thumb-screw to one of the bars $j\ j$, and $i'$ is a vertical gage secured to table A by means of its long slotted foot and a thumb-screw passing through the same into said table, Figs. 1 and 2.

$E'''$ is a small horizontal arm secured to the shaft $a'$ above the arm $B'$, and extending nearly to the outer edge of chute G. It is pivoted to the broad shank $g'$ between the two pins $o'\ o'$, which permit it to swing between them independently of shaft $a'$. A spring, $l'$, presses the arm $E'''$ against the pin $o'$ nearest the arm $B'$. By means of this device the arm $B'$ is permitted to swing to the outer end of the chute G, while the movement of the arm $E'''$ is arrested by the rack $C'$, against which it strikes. It is necessary to place the arm $E'''$ thus near the arm $B'$, so that it will clear the table D as it rises and the arms recede, Fig. 4.

The table D moves up and down upon the ways $m'\ m'$, raised upon the standards V and Q, and it is supported by the vertical rod $G'$, which slides freely through a perforated ear in the bracket $K'$.

$L'$ is a cam set upon shaft Y.

$M'$ is an angular lever pivoted at its upwardly-turned angle to a bracket secured to the standard Q. It is provided at the end of the short arm with the small wheel or roller $p'$, which rolls upon the edge of the cam $L'$ as the latter is rotated. The end of the long arm of the lever $M'$ is connected with the rod $G'$ by the bar $q'$. The cam $L'$ is so shaped and set upon shaft Y as to raise the table D to a level with table A just as the cross-heads C C approach, bringing the sides and ends of a box from racks N N, and to hold the same in that position until the box is formed, when it allows the table to descend by its own weight till it comes to the same level with the chute G, in which latter position it is held while the approaching arm $E'$ removes the box formed, and the arm $B'$ deposits thereon another bottom brought from the rack $C'$ at the end of chute G, Figs. 3 and 4.

In order to adjust the height of the table D very accurately, I insert in the lower end of the connecting-bar $q'$ a small set-screw, $s'$, which presses against a small block, upon which the bolt $r'$ rests, Fig. 3. By turning the screw $s'$ in or out the table D may be raised or lowered very slightly. The ends of the side levers, B B, extending underneath the machine, are connected with the cross-head U by means of the bars $N'\ N'$, Fig. 12. The lever B, which passes through the slot in the standard V, is connected with the cross-head U by the bar $O'$, pivoted to said lever at a point nearly underneath the cross-head.

In order that both the end levers, B B, may have precisely the same movement, I join the ends of their lower limbs by the bars $P'\ P'$, pivoted thereto and to each other in the form of an inverted V, the apex of which is connected with the bar $O'$ by the bar $Q'$, which causes said apex to travel in a nearly vertical and straight line, Fig. 3. The upper ends of the side guides, $u\ u$, are formed at the top with inwardly-projecting horizontal arms, from which depend the light rods $t'\ t'$, pivoted thereto, and provided with the retracting-springs $u'\ u'$, so as to meet the board carried by the cross-heads C C, and prevent them from tipping forward as they come to a perpendicular, Fig. 2. The arms $k\ k'$ on cross-heads C C are turned up at their front ends into small hooks $e''\ e''$, and are cut down upon their upper faces to receive the long sliding feet $v'\ v'$, which have downwardly-projecting slotted ears $w'\ w'$, by which they are secured to said arms and kept in their proper positions. The feet $v'\ v'$ are dovetailed, and form ways for the channeled blocks $i\ i$, adapted to slide thereon, and slotted to receive the small dogs or spring-catches $x'\ x'$. When properly adjusted, the blocks $i\ i$ are fixed in position by set-screws $z'\ z'$.

$a''\ a''$ are small levers, pivoted near their centers to short rearwardly-projecting shanks of the arms $k\ k'$. The lower ends of the levers $a''\ a''$ are connected with the tips of ears $w'\ w'$ by small rods $b''\ b''$, the front ends of which are connected with the arms $k\ k'$ near their front ends by the spiral springs $c''\ c''$, which draw the feet $v'\ v'$ forward against the shoulders formed by the elevated front ends of said arms $k\ k'$. The upper faces of the blocks $i\ i$ and of the arms $k\ k'$, just to the rear of their terminal hooks, lie in the same plane, and are so adjusted as to pass under the racks N N in the same plane with the upper faces of the supports $d\ d'$, or a trifle below it, as shown in Figs. 5 and 6. As the tracks F $F'$ approach the center of the machine they are curved downward, as shown in Figs. 2 and 5, to permit the cranks $s\ s$, with arms $k\ k'$, to come to a perpendicular, and at the inner ends they are raised, so as to trip the cranks and throw the terminal hooks on arms $k\ k'$ back of the faces of standards $h\ h'$, and thereby release the board carried by said arms at the bottom and allow the same to be brought snugly against table A by springs $c''\ c''$, acting through the dogs $x'\ x'$ on the upper edge of said board.

Instead of raising the front ends of the tracks F $F'$ for the purpose above described, I may use the device shown in Fig. 5, consisting of an upturned sliding hook, $f''$, having a right-angled slotted shank, $g''$, overhanging the side of the track $F'$, and secured thereto in such manner as to allow it to move freely back and forth a short distance upon said track.

$h''$ is a strong spiral spring attached at one end to an ear on the shank $g''$, and at the other to the side of track $F'$ at a point near rack N. The hook $f''$ is shaped to receive the small roller at the end of crank $s$, and so arranged as to trip the same as the arms $k\ k'$ come to a perpendicular, and to withdraw the hooks $e''\ e''$ from the boards held between them and dogs $x'\ x'$.

$k''\ k''$ are side or end plates resting upon supports $d\ d'$, and secured, one to the end guard $c$ and adjustable therewith, and the other to the end guard u, for the purpose of holding the boards accurately and firmly in the proper position to be withdrawn by the arms k k'.

R' R' are gluing-rollers, journaled in the fountains S' S', which are attached by means of brackets l'' l'' to the end racks, N N, in pairs, one of each pair to the front of the racks N N and the other to the front of arms O O, so as to be adjusted therewith. The fountains S' S' are formed into sleeves in the rear to receive the vertical standards of brackets l'' l'', upon which they freely slide and from which they can be readily removed when the machine is not in use. A glue-pot, T', supported upon table A, supplies the fountains S' S' through the pipe U', connected with each fountain by the flexible tubes n'' n'', which permit of the vertical movement of the fountains and of the lateral adjustment of the fountain attached to the arm O. The glue-pot T' is formed with double walls, inclosing a space, into which steam is admitted through pipe m''. By this means the glue may be kept hot and in a liquid state. The peripheries of the rollers R' R' are provided with brushes o'' o'', made of felt, bristles, or any other suitable material. The fountains S' S' are so placed that the rollers R' R' will pass over the fingered ends of the boards as they emerge from racks N N, and are hung sufficiently low to be raised and sustained by the ends as they pass under the same, as seen in Figs. 5, 6, and 7. The fountains S' S' are closed at the bottom by rollers R' R', so as to prevent the escape of glue, except when the latter are in motion.

W, X, and Y, Figs. 13 and 14, are end, side, and bottom pieces, showing the preferable method of cutting the same for my new machine.

My new machine operates as follows: The racks N N are adjusted for making boxes of the desired size by placing a pile of sides and ends in their proper places against the fixed guides u u in each rack and then bringing the guides c c on arms O O and the gages e e close up to their exposed sides, so as to bear against said sides, and securing them in position by means of the thumb-screws e' and n'. A pile of bottoms is placed in the rack C', snugly in the corner formed by said rack and the flange f'. The gages d'' and i' are then brought close up to the remaining sides and set by their thumb-screws in position to bear against said sides, and so retain the pieces in proper position. The cross-heads C C are adjusted by setting the blocks P P, so that the arms k' k' will come a little inside of the fingered ends of the pieces in racks N N, and are then secured in position by the clamps and screws g g. The corners E' E' are set by means of the hand-screws v v, the corner E' at the end of the central opening in table A, at a distance from fixed corner E equal to the length of the ends of the box, and the corner E' at the side of said opening at a distance from said fixed corner E, equal to the length of the sides of the box. The corner E'' is then set by means of the hand-screws l and m, so that its apex will be at the angle of a rectangle, of which the corners E E' E' mark the remaining three angles. The corners E' E' are secured in position by means of the set-screws z z, and the corner E'' by means of clamp f and set-screw n. In adjusting the corners E' E', as just described, the dovetailed ways H' H', upon which said corners are raised, are at the same time adjusted for the proper travel of their cross-heads C C, the faces of the standards h h' of which are made to advance to the side and end of the rectangle included between the corners E, E' E', and E'', by lengthening and shortening the bars J' J', connecting said cross-heads with levers B B, an adjustment readily made by means of the hand-screws Z Z, turning in sleeves I' I', to which the levers B B are pivoted, as hereinbefore described. Steam is admitted into the space surrounding the glue-pot T' through pipe m'', and the glue thereby reduced to a liquid state and fed into fountains S' S' through pipe U' and flexible tubes n'' n'', when it is ready to be applied to the ends of the boxes as they emerge from their racks N N by means of the brushes o'' o'' on rollers R' R'. The racks N N and C' having been supplied with ends, sides, and bottoms, the machine is set in motion by means of power applied thereto through fixed pulley t. The cross-heads C C now travel back and forth between the central opening in table A and the racks N N taken at each journey a side and end from the bottom of the pile in each rack, and carrying the same to a perpendicular position at the center of the machine, where they are forced together about a bottom raised to position by the table D.

The operation of each of the cross-heads C C being the same it will be sufficient to describe one in detail—for instance, the one shown in Fig. 5. As the arms k k' pass under the pile of ends the dogs x' x' strike the bottom of the pile and are forced into the blocks i i, and just before the hooks e'' e'' on arms k k' come to the inner edge of the lowest end in the pile the tops of the levers a'' a'' strike against the rear side of the rack N, as shown by dotted lines in Fig. 6, the lower ends of the levers a'' a'' are thrown outward, and through the connecting-rod b'' b'' force the feet v' v' with their blocks i i back on the faces of the arms k k', so that the dogs x' x' are carried a little to the rear of the pile of ends, and are forced by springs (shown in Fig. 15) up out of the blocks i i. The cross-head now advances, and the levers a'' a'' leave the side of rack N, thereby releasing the feet v' v', which are drawn forward by the springs c'' c'' till the dogs x' x' engage with the rear edge of the bottom end and grasp the same firmly between them and the terminal hooks e'' e''. As the end emerges from the pile it is carried underneath the gluing-rollers R' R', which, with the fountains S' S', are slightly raised, so that their weight is sustained upon the same as the rollers are rotated and the glue is spread by the brushes o" o" over its fingered ends. The brushes o" o" are filled with glue as they pass through the fountains S' S'; but when the rollers R' R' are at rest they prevent the escape of glue from the small openings left at the bottom of said fountains. As the cross-head C advances and the roller or crank s passes over the depressed portion of the track F', the arms k k' assume a perpendicular position, and the end carried by them meets one of the rods t', which prevents it from tipping forward in case the dogs x' x' loose their hold upon its upper edge. The wheel on crank s meets the raised portion of the track F' or the hook f'', by which the arms k k' are turned back and the terminal hooks e" e" drawn back of the face of the standards h h', releasing the lower edge of the end and allowing it to be brought down snugly against the table A. As the end passes the corners E E' it meets the sides brought by the cross-heads C C from the side racks, N N, and the bottom raised into position by the table D, and they are forced together in the manner shown in Fig. 14. The operation is simultaneous and the same at both ends of the machine. The glue spread upon the ends is forced into the fingered joints as the pieces come together, and the four corners are thereby effectually formed and glued at one operation. The table D now descends with its box, which is removed by the arm E', while the arm B' brings another bottom from rack C and deposits it upon said table D for the next box. The operation just described is repeated, and at each revolution of the wheel W a box is glued and put together. As the arm B' passes under the pile of bottoms in rack C' the tips of the fingers c' c' c' are turned down; but as they emerge at the rear of the pile they assume their original position by reason of the counterbalancing-weight of their rear ends.

Instead of applying the gluing device to the end racks I may apply it to the side racks, or to both end and side racks, although I prefer to attach it to the end racks alone.

The table D and the swinging arm B' and their connections may be dispensed with and the table A made without a central opening whenever it is desired to attach the bottom at a separate operation by nails or means other than those described.

I claim—

1. The combination, in a box-machine, of the table having guideways thereon, bell-crank levers pivoted to the frame of the machine opposite said guideways, cross-heads adjustably connected to one arm of said levers so as to move on said table, and driving-pitmen connected to the other arms of said levers, substantially as described.

2. The combination, with the box-machine table having a central aperture and guideways leading thereto, bell-crank levers connected to the cross-heads, and operative pitmen also connected to the cross-heads, of a vertically-movable table below said aperture in the main table, and mechanism for raising said table, substantially as described.

3. The main table having aperture therein, the rising table placed underneath said aperture, a lever connected to said table by connections, substantially as described, and a cam for oscillating said lever so as to lift the movable table, all combined and arranged substantially as described.

4. The table having central aperture, the rising-and-falling table beneath said aperture, and suitable mechanism, substantially as described, for operating the same, the chute G, and a swinging arm adapted, as described, to convey a box-bottom from said chute to the rising-and-falling table, all combined in a box-machine, substantially as set forth.

5. The main table having central aperture, the rising-and-falling table beneath said aperture, the chute having curved ways leading toward said rising-and-falling table, the swinging arm having fingers projecting between said ways, and operating mechanism, substantially as described, to move the table and swinging arm, all combined in a box-machine, substantially as described.

6. The main table having central aperture, the rising-and-falling table beneath said aperture, vertical guideways for the last-mentioned table, a standard supporting the table, a connecting-rod pivoted to said standard and provided with an adjusting-screw, a lever connected to said rod, and a cam for operating said lever, all combined and arranged in a box-machine, substantially as stated.

7. The curved chute, the swinging arm provided with mechanism for carrying the box portions along said chute, and the rising-and-falling table at the end of said chute, combined with the main table, the rack thereon, and mechanism, substantially as described, for conveying a side piece from said rack to the aperture in the table, together with suitable driving mechanism, substantially as described, whereby a box-bottom is conveyed from the chute and a side piece from the rack to be joined together at the central portion of the machine, substantially as stated.

8. In a box-machine, a curved chute having curved slots in its bottom, a swinging arm operating, as described, under said chute, and having fingers projecting through said slots, and mechanism, substantially as described, for operating said arm, whereby a portion of the box may be conveyed from the chute to a position ready for subsequent operation, the described elements being combined substantially as stated.

9. In a box-machine, the curved chute composed of bars, as described, the swinging arm beneath said chute, and suitable driving mechanism therefor, and counterbalanced fingers on said swinging arm, projecting between said bars, all combined substantially as stated.

10. The curved chute composed of bars, as described, the swinging arm beneath said chute, having fingers which extend up between the bars, and a rack placed above said chute to contain the box-bottoms, all combined and arranged in a box-machine, substantially as stated.

11. The rack, as C', for the box-bottoms, adjustable in size by mechanism, substantially as described, the curved chute beneath said rack, the swinging arm having projections which extend through slots in the bottom of the chute, and operating mechanism for said arm, all combined in a box-machine, substantially as stated.

12. The two end levers B B and mechanism, substantially as described, connected thereto, for manipulating the box-ends, the side levers, B B, and similar mechanism for manipulating the box-sides, all the levers being pivoted to the frame and actuated by pitmen or equivalent connections, as shown, the reciprocating cross-head, as U, and connections, substantially as described, from the levers to the cross-head, all combined, substantially as described, so that the reciprocation of the cross-head will advance all the box-sides simultaneously, substantially as set forth.

13. The machine-table, the side-conveying cross-heads arranged thereon at right angles to each other, the bell-crank levers similarly arranged, so as to be simultaneously moved by the driving-connections, and screw-rods having nuts thereon, substantially as described, connecting the cross-heads with the bell-crank levers, all combined in a box-machine, substantially as and for the purpose stated.

14. The machine-table, the cross-heads arranged at right angles thereon, and having mechanism attached thereto for the manipulation of the box-sides, the bell-crank levers pivoted at right angles to each other and operated by suitable mechanism, substantially as described, and the screw-rods J', pivoted to the cross-heads and working in swiveled bearings in the levers, all combined substantially as set forth.

15. The machine-table having central aperture, the cross-heads arranged at right angles to each other upon ways on said table, screw-rods pivoted to the cross-heads, bell-crank levers pivoted as described in the frame of the machine, and mechanism to operate the same, and swiveled bearings on said levers to which the screw-rods are connected by set-nuts, all the elements combined and arranged substantially as set forth.

16. A box-machine table slotted as described, cross-heads and reciprocating mechanism therefor, adjustable ways, as H' H', having tongues which extend through the slots in the table, hand-screws which engage said tongues to move the ways, and set-screws for securing the same in position, all combined and arranged substantially as stated.

17. The combination, with a box-machine table having central aperture, of corner-pieces, as E E', &c., having acute angles which are toward the center of the table, and adjusting mechanism, substantially as described, whereby the location of certain of the corner-pieces may be changed with reference to the fixed corner-piece and to each other, substantially as set forth.

18. A box-machine table having central aperture, a fixed corner-piece, E, having its acute angle in proximity to said aperture, as described, corner-pieces E' E', having their acute angles toward said aperture, and each adjustable in one direction, and corner-piece E'', having its acute angle toward the aperture and being adjustable in two directions, all in combination, substantially as set forth.

19. In combination with a box-machine table having central aperture, as described, the adjustable corner-piece E'', arranged with its acute angle toward said aperture, the bar K, which supports said piece, provided with a way upon which said bar is adapted to slide at right angles to the side of said aperture, said plate being adapted to slide in a way in said table parallel to the side of said aperture, hand-screws seated on the table and adapted to move said plate and bar, as described, and a screw-clamp for retaining the corner and its supporting parts in position, all substantially as set forth.

20. A box-machine table, a reciprocating cross-head thereon provided with standards, arms, as $k$, pivoted to supports on said standard, a crank-extension connected with said arms, and an inclined way or track on which said crank rides, whereby the arms are moved from a horizontal to a vertical position as the cross-head moves forward, all the parts being combined substantially as set forth.

21. A box-machine table, four reciprocating cross-heads arranged thereon at right angles to each other, mechanism for reciprocating the same, pivoted arms on each cross-head, and mechanism, substantially as described, to operate said arms, whereby four box-sections may be taken from the sides of the table in a horizontal position and brought together in vertical position at the middle of table, all the elements being combined and arranged for joint operation substantially as set forth.

22. A box-machine table, a reciprocating cross-head thereon, arms, as $k\ k'$, pivoted to supports on said standards, mechanism, substantially as described, for swinging said arms from a horizontal to a vertical position, and spring-catches on said arms, whereby a box-section may be clasped to said arms, all combined substantially as set forth.

23. A box-machine table, a reciprocating cross-head thereon, arms, as $k\ k'$, pivoted to extension on said cross-head, mechanism, substantially as described, by which said arms are brought from the horizontal to vertical position as the cross-head advances, spring-dogs, as $x'\ x'$, upon the upper face of the arms, and terminal hooks, as $e''\ e''$, whereby the box-section may be grasped by the opposite edges taken from a superposed rack and held to said arms, all the elements in combination, substantially as stated.

24. A box-machine table having a reciprocating cross-head thereon, pivoted arms connected to said cross-head, and mechanism, substantially as described, to bring the arms from a horizontal to a vertical position as the cross-head moves forward, and gluing devices, substantially as described, whereby glue is applied to the ends of the sections during the forward movement of the cross-head, all in combination, substantially as stated.

25. A box-machine table, four reciprocating cross-heads thereon, pivoted arms connected to each cross-head, as described, mechanism, substantially as described, whereby the arms are brought from horizontal to vertical position as the cross heads near the middle of the table, superposed racks for containing box-sections for each cross-head, and gluing devices, substantially as described, whereby glue is applied to the ends of the box-sections as the cross head advances, all in combination, substantially as stated.

26. A box-machine table having reciprocating cross-heads thereon, arms pivoted to said cross-heads, mechanism, substantially as described, to bring said arms from horizontal to vertical position as the cross-head moves forward, and stops, substantially as described, extending in front of the path of movement of said arms, whereby if the catches on the arms fail to hold the box-section thereto the stop may serve such purpose, the above elements in combination, substantially as stated.

27. A box-machine table having central aperture, four reciprocating cross-heads arranged, as described, with reference to said aperture, arms pivoted to said cross-heads, and mechanism for bringing said arms from a horizontal to a vertical position as the cross-head moves forward, gluing apparatus arranged, as described, to apply glue to the ends of each box-section, a reciprocating table which is adapted to rise into the main-table aperture, and operating mechanism, substantially as described, whereby the box-sections are assembled and pressed together, all in combination, substantially as stated.

In testimony that I claim the foregoing as my own I affix my signature in presence of two witnesses.

GEORGE RICHARDSON.

Witnesses:
 CHAS. L. GOSS,
 FRANK REGENSDORF.